United States Patent
Yang et al.

(10) Patent No.: US 8,170,132 B2
(45) Date of Patent: May 1, 2012

(54) METHOD AND APPARATUS FOR TRANSMITTING SIGNALS IN A MULTIPLE ANTENNAS SYSTEM

(75) Inventors: Xuezhi Yang, Shenzhen (CN); Wei Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 12/782,294

(22) Filed: May 18, 2010

(65) Prior Publication Data

US 2011/0044402 A1  Feb. 24, 2011

(30) Foreign Application Priority Data

Aug. 21, 2009  (CN) .......................... 2009 1 0189604

(51) Int. Cl.
*H04B 7/02* (2006.01)

(52) U.S. Cl. ......... 375/267; 375/260; 375/262; 375/265

(58) Field of Classification Search .................. 375/267, 375/260, 262, 265; 370/203, 204, 205, 208, 370/209, 210; 455/132

See application file for complete search history.

(56) References Cited

U.S. PATENT DOCUMENTS

| 6,788,661 | B1 | 9/2004 | Ylitalo et al. |
| 6,975,607 | B2* | 12/2005 | Sekine et al. ............... 370/331 |
| 8,040,789 | B2* | 10/2011 | Noh et al. ................... 370/208 |
| 2005/0073976 | A1* | 4/2005 | Fujii ............................ 370/334 |
| 2007/0082625 | A1* | 4/2007 | Hwang et al. .............. 455/101 |

FOREIGN PATENT DOCUMENTS

| EP | 1 895 677 A2 | 3/2008 |
| JP | 2003-514428 A | 4/2003 |
| JP | 2004-64108 A | 2/2004 |
| JP | 2005-110130 A | 4/2005 |
| JP | 2006-295681 A | 10/2006 |
| WO | WO 2005/053185 A1 | 6/2005 |

OTHER PUBLICATIONS

Lin, M., et al., "A New Transmit Scheme Combining Beamforming with Space-Time Block Coding," IEEE International Conference on Communications, ICC '08, pp. 3961-3965, May 19-23, 2008, Beijing.

European Search Report, European Application No. 10163224.8-1246, Applicant: Huawei Technologies Co., Ltd., Dated: Sep. 23, 2010, 9 pages.

Japanese Notice of Reasons for Rejection, Application No. 2010-126736, dated Jan. 10, 2012, 5 pages.

* cited by examiner

*Primary Examiner* — Dhaval Patel
(74) *Attorney, Agent, or Firm* — Slater & Matsil, L.L.P.

(57) ABSTRACT

A method and apparatus for transmitting signals in a Multiple Antennas System (MAS) are disclosed. The method includes performing Alamouti coding on each group of common channel symbols to form two branches; selecting different weight vectors for different branches to perform beamforming, obtaining transmitting signals of each branch on each antenna, where beam modes corresponding to different weight vectors are uncorrelated and the peak-to-average power ratio of angle dimension of the two beam modes are lower than a preset threshold; and superimposing the transmitting signals of these two branches on each antenna, and transmitting the superimposed signals. In the present invention, the Alamouti coding is introduced, and a spatial diversity gain is generated by using the independence of two virtual channels. Thus, the performance of the MAS in full coverage is enhanced.

17 Claims, 3 Drawing Sheets

METHOD AND APPARATUS FOR TRANSMITTING SIGNALS IN A MULTIPLE ANTENNAS SYSTEM

This application claims priority to Chinese Patent Application 200910189604.4, which was filed Aug. 21, 2009 and is incorporated herein by reference.

TECHNICAL FIELD

The present invention relates to the communication field, and in particular, to transmitting signals in a multiple antenna system.

BACKGROUND

Since 1990s, the wireless communication industry has witnessed explosive growth. With more and more mobile voice, data, and video services, higher bandwidths are required for the wireless communication systems. Available frequency band resources, however, are gradually in short supply. Thus, how to increase the frequency spectrum utilization becomes a critical issue in the wireless communication research.

Technologies that can be used to increase the frequency spectrum utilization include multiple access, signal detection, modulation, and channel coding. The Multiple Antennas System (MAS) technology has a huge potential of increasing the frequency spectrum utilization, and plays an increasingly important role in the wireless communication field.

The Smart Antenna (SA) is a kind of MAS, and is also called an Antenna Array System (AAS). The array element spacing of the SA is generally smaller than the coherent distance of the channel. By using the signal correlation between the antenna array elements, the beams can be formed, and high-gain narrow beams can be adaptively pointed to a mobile terminal in the communication. In addition, the null can be pointed to the interference direction.

FIG. 1 shows a structure of a typical SA. The SA array of a narrow-band signal includes M (>1) antenna array elements. m is one of the M antenna array elements. M receive antennas correspond to M receive channels, and M transmit channels correspond to M transmit antennas.

For a specific user, a Direction Of Arrival (DOA) estimating module estimates the DOA information of the user according to the receive signals on the M antenna array elements. An adaptive beam forming weight coefficient generator adjusts the weight vectors of the adaptive beam forming weight coefficient generator according to the DOA information of the specific user, and generates a weighted coefficient for each transmit channel. The weight coefficient tuner of each channel adjusts (by multiplication) a dedicated channel signal s (t) by using the weight coefficient of its own channel. Then, the weight coefficients w1, w2, . . . , wM of the M antenna array elements form a weight vector w, so that a pointing beam is formed for the specific user and follows up the user movement adaptively. The asterisk "*" in FIG. 1 represents a conjugation symbol.

Multiple Input Multiple Output (MIMO) is another kind of the MAS. Foschini theoretically proves the huge potential of the MIMO in increasing the frequency spectrum utilization. The channel capacity of the MIMO linearly increases along with the quantity of antennas (in positive proportion to the minimum number of antennas of the transceiver). The MIMO technology may also be considered to be a SA. The difference between the MIMO and the SA lies in the antenna array element spacing. Non-correlation should be kept between the MIMO system antennas.

In a cellular mobile communication system, the base station allocates a dedicated channel for each active user in a cell or sector to carry voice, data or video services. The base station based on multiple antennas can use technologies such as beam forming or pre-coding on the dedicated channel to transmit signals for the specific user and reduce the interference with other users.

In a real mobile communication system, a common channel is also required in the cell or sector to carry the common information that are needed by all mobile terminals, such as system information in the broadcast channel, reference signals in the synchronization channel, and pilot information, paging information and common control information in the Forward Access Channel (FACH). The common channel and the dedicated channel have different requirements on the coverage of the base station. The common channel requires that all the mobile terminals in the cell or sector should receive signals at the same time. Thus, the base station must have good full coverage performance.

There is an antenna array cell/sector coverage solution that the transmit time of the common channel signal is divided into timeslots; a group of weight vectors with complementary antenna patterns is selected, and complementary weight vectors are used in turn in the successive timeslots. Thus, the SA-based full cell/sector coverage is realized.

Although multiple complementary weight vectors are used in turn in the foresaid solution, the quantity of weight vectors is limited and the antenna pattern corresponding to each weight vector is fixed. Thus, the average values of antenna gains of multiple antenna patterns are not equal completely, but only in approximate direction, causing big differences in the Bit Error Rate (BER) in each direction. Therefore, the full coverage performance needs to be improved.

SUMMARY OF THE INVENTION

Embodiments of the present invention provide a method and apparatus for transmitting signals in a Multiple Antennas System (MAS), so that the performance of the MAS in full coverage is enhanced.

A method for transmitting signals in a MAS is provided in an embodiment of the present invention. The method includes:

performing Alamouti coding on each group of common channel symbols to form two branches; selecting different weight vectors for different branches to perform beamforming, obtaining transmitting signals of each branch on each antenna, where beam modes corresponding to different weight vectors are uncorrelated and the peak-to-average power ratio of angle dimension of the two beam modes are lower than a preset threshold; and superimposing the transmitting signals of these two branches on each antenna to obtain the superimposed signal on each antenna, and transmitting the superimposed signals.

An apparatus for transmitting signals in a MAS is provided in an embodiment of the present invention. The apparatus includes:

a coding module, configured to perform Alamouti coding on each group of common channel symbols to form two branches;

a weight vector obtaining module, configured to select different weight vectors for different branches, where the beam modes corresponding to different weight vectors are uncorrelated and the peak-to-average power ratio of angle dimension of the two beam modes are lower than a preset threshold;

a beam forming module, configured to: perform beamforming for different branches according to the selected weight vectors, and obtain transmitting signals of each branch on each antenna; and a sending module, configured to: superimpose the transmitting signals of the two branches on each antenna to obtain the superimposed signal on each antenna, and transmit the superimposed signals.

According to the preceding technical solution of embodiments of the present invention, the Alamouti coding is introduced at the transmit end, and two independent virtual channels are generated by using the MAS. By using the independence of these two virtual channels, spatial diversity gains are generated, and beams are formed. In this way, signals received in all directions have the same quality, thus enhancing the performance of the MAS in full coverage.

DETAILED DESCRIPTION OF ILLUSTRATIVE EMBODIMENTS

The technical solution of the present invention is hereinafter described in detail with reference to the accompanying drawings. It is evident that the embodiments are only exemplary embodiments of the present invention and the present invention is not limited to such embodiments. Other embodiments that those skilled in the art obtain based on embodiments of the present invention also fall within the scope of protection of the present invention.

Embodiments of the present invention provide a method and apparatus for transmitting signals, so that the performance of the common channel in full coverage is enhanced in the entire cell or sector.

The method for transmitting signals in an embodiment of the present invention includes:

(1) Perform Alamouti coding on each group of common channel symbols to form two branches.

In this embodiment, multiple antennas send a common channel signal, and divide the common channel symbols into groups (each group includes two symbols), and perform Alamouti coding on each group to form two branches.

(2) Select different weight vectors for different branches.

After the Alamouti coding is performed, different weight vectors are selected for the two branches to perform beamforming, and transmitting signals of branches on each antenna are obtained. The dimensions of each weight vector are equal to the quantity of transmit antennas. In addition, the two different weight vectors correspond to uncorrelated beam modes whose peak-to-average power ratios of angle dimension of the two beam modes are lower than a preset threshold.

(3) Superimpose two branch symbols that undergo the beam forming, and send the superimposed symbols.

The transmitting signals of the two branches on each antenna are superimposed and then transmitted.

In this embodiment, two different weight vectors may be considered to be two virtual antennas. Because the two virtual antennas usually have different gains in the same direction, they may be considered to be uncorrelated virtual antennas. In this embodiment, the Alamouti coding is introduced at the transmit end; two virtual antennas are generated by using the MAS; and spatial diversity gains are obtained by using the non-correlation of the two virtual antennas. Thus, signals received in all directions have the same quality, and the performance of the MAS in full coverage is enhanced.

Figure 1:
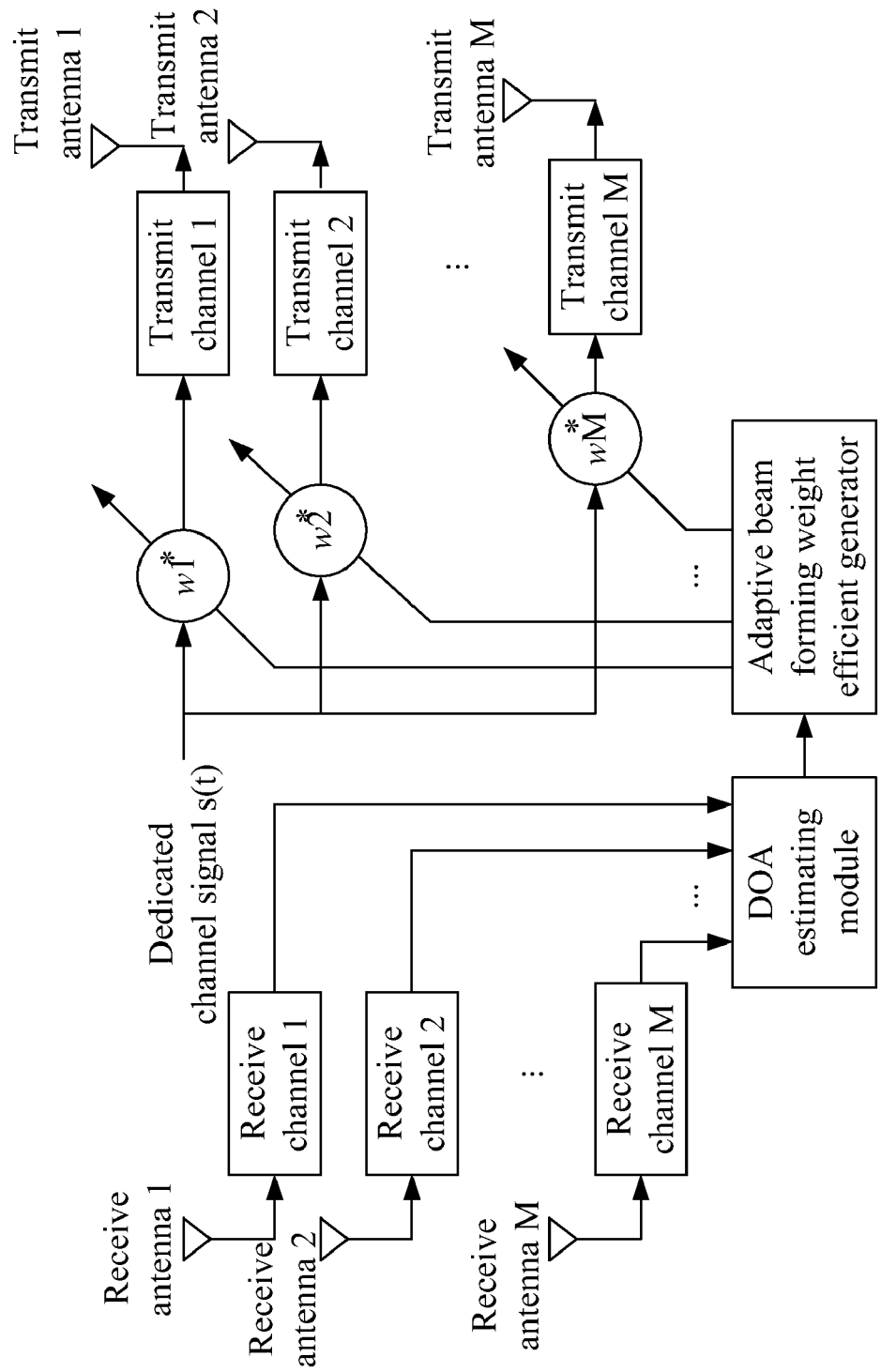
FIG. 1 is a schematic diagram illustrating the beam forming of a SA in the prior art.
Figure 2:
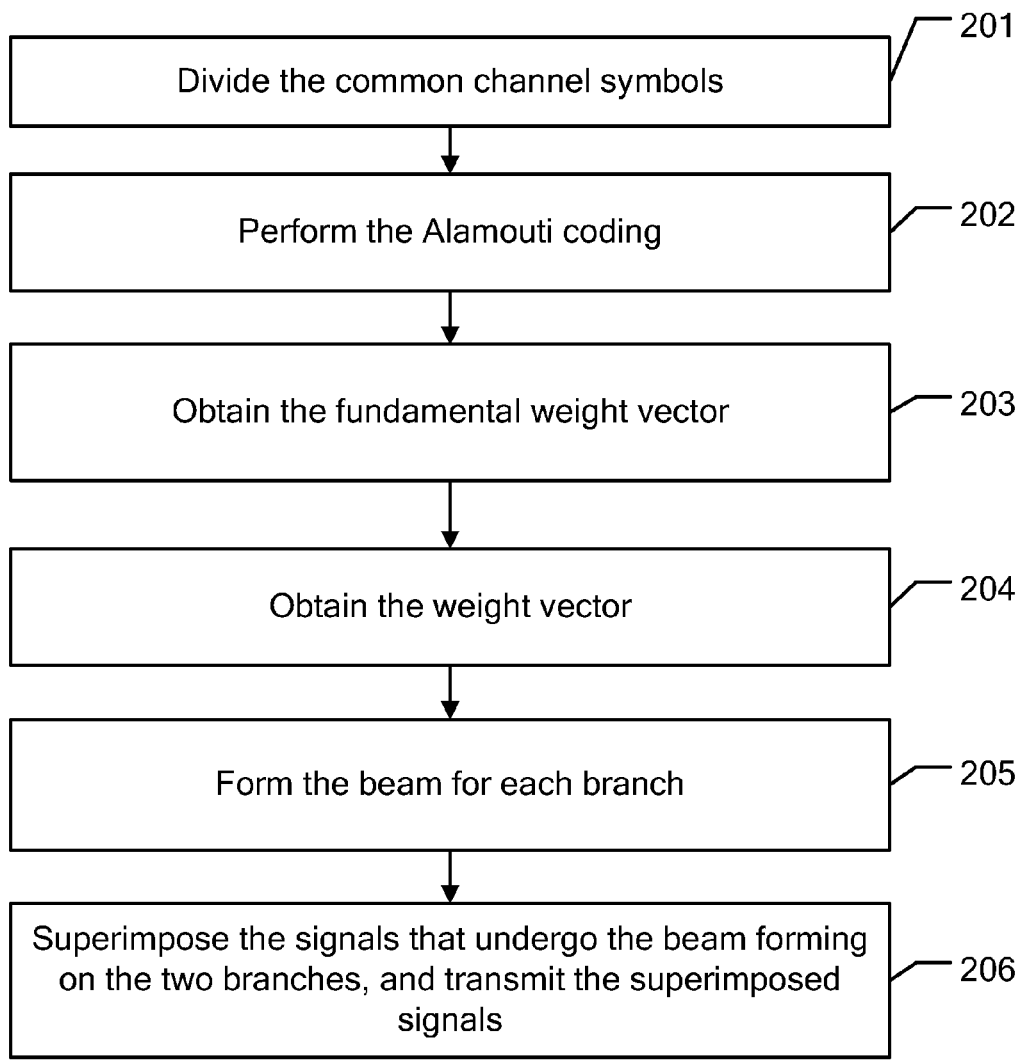
FIG. 2 is a flowchart of a method for transmitting signals in a MAS in an embodiment of the present invention.

For better understanding, the following describes the method for transmitting signals in the MAS in an embodiment of the present invention with reference to the accompany drawings. As shown in FIG. 2, the method includes:

Step 201: Divide the common channel symbols.

In this embodiment, when signals in the common channel need to be transmitted, every two common channel symbols may be put into a group. Each group may be represented by $s=[s_1, s_2]^T$. The common channel symbols may be broadcast or multicast bits that undergo the channel coding, interleaving, and constellation mapping.

Step 202: Perform the Alamouti coding.

Specifically, the Alamouti coding is to convert each group of symbols $s=[s_1, s_2]^T$ as follows:

$$s = [s_1, s_2]^T \rightarrow S = \begin{bmatrix} s_1 & -s_2^* \\ s_2 & s_1^* \end{bmatrix} \quad (1)$$

$(.)^*$ represents conjugation. Each row of the matrix S corresponds to an antenna array element in the space domain, and each column of the matrix S corresponds to a transmit time-frequency resource block on the time-frequency domain. In this embodiment, the first row $[s_1 -s_2^*]$ corresponds to the first spatial branch, namely, the virtual antenna. Similarly, the second row $[s_2\ s_1^*]$ corresponds to the second spatial branch. For the transmit symbol s, $s_1$ and $s_2$ are transmitted on the first time-frequency resource block, and $-s_2^*$ and $s_1^*$ are transmitted on the second time-frequency resource block. The channel response values of each antenna on the two time-frequency resource blocks are highly correlated and supposed to be the same. Because one Alamouti code block has only two symbols on each time-frequency block, each time-frequency resource block may transmit multiple Alamouti code blocks at the same time. The quantity of transmitted Alamouti code blocks depends on the size of the time-frequency resource block.

Step 203: Obtain the fundamental weight vector.

In this embodiment, a fundamental weight vector $w=[w_1\ w_2\ \ldots\ w_M]^T$ is designed. The fundamental weight vector includes M weight coefficients, which are labeled as $w_m$, $m=1, \ldots, M$. The M weight coefficients correspond to M transmit channels, namely, M antennas, where the M is an integer greater than 1.

The $x^T$ represents transposed x. For example, the matrix $[w_1\ w_2 \ldots w_M]^T$ represents the transposed matrix $[w_1\ w_2 \ldots w_M]$.

The coverage angle of the beam generated by the fundamental weight vector that undergoes the beam forming should reach the preset threshold. The beam flatness should reach the preset threshold, and the peak-to-average power ratio of angle dimension of the two beam modes are lower than the preset threshold. That is, the beam should have features such as wide coverage angle, flatness, and low peak-to-average power ratio. The peak-to-average power ratio in terms of angle dimension is equal to the maximum power in terms of angle dimension divided by the power average in terms of angle dimension.

To reduce costs and ensure that each power amplifier can be efficiently used, the transmit power of each antenna may be set to be equal. That is, the modulus of each weight coefficient in the fundamental weight vector is equal, $|w_1|=|w_2|=\ldots=|w_M|$.

Step 204: Obtain the weight vector.

For the first spatial branch, the phase value $\phi_1$ between 0 and $2\pi$ is selected. The weight vector on the first branch is calculated according to the fundamental weight vector w by using formula (2):

$$w_1 = \text{diag}[1\, e^{j\phi_1} e^{j2\phi_1} \ldots e^{j(M-1)\phi_1}] \cdot w \qquad (2)$$

For the second spatial branch, the phase value $\phi_2$ ($\phi_2 \neq \phi_1$) between 0 and $2\pi$ is selected. The weight vector on the second branch is calculated according to the fundamental weight vector w by using formula (3):

$$w_2 = \text{daig}[1\, e^{j\phi_2} e^{j2\phi_2} \ldots e^{j(M-1)\phi_2}] \cdot w \qquad (3)$$

In addition, the weight vectors of the two branches may be represented by formula (4), in which the t represents the branch sequence number:

$$w(t) = \text{diag}[1\, e^{j\phi(t)} e^{j2\phi(t)} \ldots e^{j(M-1)\phi(t)}] w \qquad (4)$$

It is understandable that more methods may be used to convert the fundamental vector into weight vectors by using the phase in actual applications. The specific method is not limited in this embodiment.

Step 205: Form the beam for each branch, and obtain the transmitting signals of the branches on each antenna.

The beams generated by the weight vectors corresponding to the two branches need to be complementary in directions. For example, for the linear array, the uncorrelated beams may be represented as follows:

$$g_1 = w_1^H \alpha(\theta) = \sum_{m=1}^{M} w_m^* e^{-j\frac{2\pi}{\lambda}(m-1)d\sin\theta - j(m-1)\phi_1} \qquad (5)$$

$$g_2 = w_2^H \alpha(\theta) = \sum_{m=1}^{M} w_m^* e^{-j\frac{2\pi}{\lambda}(m-1)d\sin\theta - j(m-1)\phi_2} \qquad (6)$$

where the $\alpha(\theta)$ represents the direction vector of the antenna array and is an M-dimensional column vector; the $\theta$ represents the direction angle between the signal and the antenna array, and the peak-to-average power ratio of angle dimension of the two beam modes are lower than the preset threshold; the M represents the quantity of antennas; the $w_m$ represents the weight coefficient on the $m^{th}$ antenna; the $w_m^*$ represents the conjugation of the $w_m(t)$; the d represents the array element spacing; and $j=\sqrt{-1}$.

Step 206: Superimpose the signals that undergo the beam forming on the two branches, and transmit the superimposed signals.

The transmitting signals of the two branches on each antenna are added, and thus the transmit signal on each antenna is obtained.

Supposing the phase values selected by forming models 1 and 2 are $\phi_1$ and $\phi_2$, the data upon the Alamouti time-space frequency coding is $$s = \begin{bmatrix} s_1 & -s_2^* \\ s_2 & s_1^* \end{bmatrix}.$$

In this case, the two weight vectors obtained according to the fundamental weight vector are as follows:

$$\begin{cases} w_1 = \text{diag}[1\ e^{j\phi_1}\ e^{j2\phi_1}\ \ldots\ e^{j(M-1)\phi_1}]w \\ w_2 = \text{diag}[1\ e^{j\phi_2}\ e^{j2\phi_2}\ \ldots\ e^{j(M-1)\phi_2}]w \end{cases} \qquad (7)$$

For two symbols of each time-frequency resource block in the code block, for example, $[s_1, s_2]^T$, the two components are multiplied by two weight vectors that include M elements to obtain two M-dimensional vectors. These two vectors are added to form an M-dimensional vector, which is sent to M transmit antennas. Each element of the M-dimensional vector corresponds to an antenna of the MAS. That is, $$s' = s_1 w_1 + s_2 w_2 = \text{diag}[(s_1+s_2) s_1 e^{j\phi_1} + s_2 e^{j\phi_2} \ldots \\ s_1 e^{j(M-1)\phi_1} + s_2 e^{j(M-1)\phi_2}]w \qquad (8)$$

Subsequently, the transmitting signals on each antenna may be transmitted after undergoing the OFDM.

One Alamouti code involves two time-frequency blocks, on which a same weight coefficient is used for each branch. That is, the forming modes of the two virtual antennas on the two time-frequency blocks remain unchanged (also called beam forming). For the convenience of description, it is assumed that the two time-frequency blocks form a frame and transmit two code output symbols of the Alamouti time-space frequency code in terms of time-frequency dimension. A same group of weight vectors is used in the same frame, where the same group of weight vectors includes two different weight vectors $\phi_1$ and $\phi_2$. The frame is a frame in a broad sense, which extends the traditional time frame to the time-frequency dimension. The successive transmit symbols are grouped into frames. If more frames are available, the phase of a next frame may be obtained by using the current phase and the inter-frame incremental phase value. Details are as follows:

$$\phi_p(k) = \phi_p + k\cdot\delta,\ p=1,2 \qquad (9)$$

The next frame is adjacent to the current frame in terms of time-frequency. In the above formula, the k represents the number of frames of the transmit signal; the p represents two different forming modes; and the $\delta$ represents the selected inter-frame incremental phase value, which corresponds to the initial frame. The two complementary conversion phases in the first frame are as follows: $\phi_p(1)=\phi_p+\delta$, p=1,2.

For the receive end, the receive signal may be represented as follows after the transmit vector s' obtained in formula (8) passes through the wireless channel:

$$r_1 = (g_1 s_1 + g_2 s_2)h + n_1$$

$$r_2 = (g_2 s_1^* - g_1 s_2^*)h + n_2 \qquad (10)$$

where the $n_1$, $n_2$ indicate a zero average value and a Gaussian noise value with the variance $\delta^2$.

The channel attenuation value is superimposed with the bean forming value. Because $g_n$, n=1,2 are mutually independent, two independent virtual channels may be generated, and represented by $h=[h_1, h_2]^T=[g_1 h, g_2 h]^T$. If the receive signal vector is defined as $r=[r_1, r_2^*]^T$ and the noise vector is defined as $n=[n_1, n_2^*]^T$, the preceding formula may be represented by the following matrix:

$$r = Hs + n \qquad (11)$$

The channel response matrix is defined as follows:

$$H = \begin{bmatrix} h_1 & h_2 \\ h_2^* & -h_1^* \end{bmatrix} \quad (12)$$

If the Minimum Mean Square Error (MMSE) demodulation is performed on the receive signal, the spatial diversity gain of the Alamouti coding may be obtained. The demodulation formula is as follows:

$$s_{mmse} = (H^H H + \delta^2 I)^{-1} H^H r \quad (13)$$

In this embodiment, the Alamouti coding is introduced at the transmit end; two uncorrelated virtual antennas and spatial diversity gains are generated by using the MAS. Thus, the performance of the MAS in full coverage is enhanced.

Figure 3:
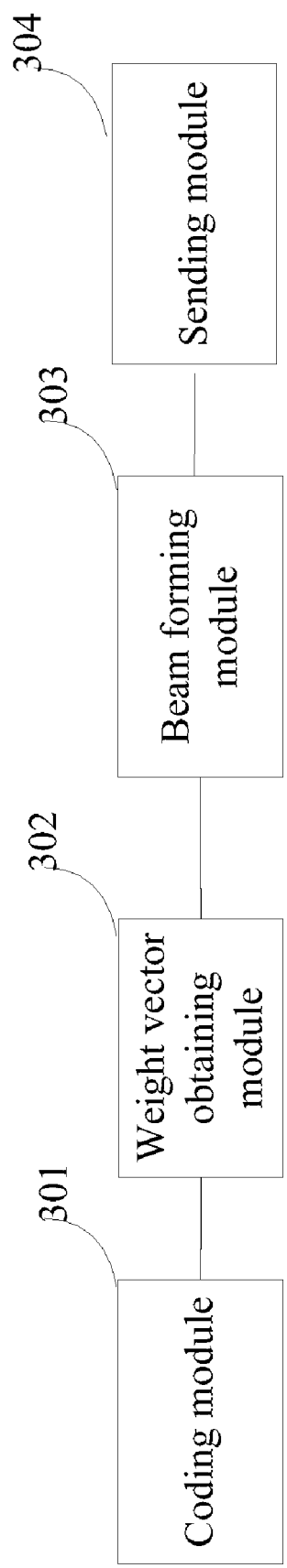
FIG. 3 shows a structure of an apparatus for transmitting signals in a MAS in an embodiment of the present invention.

The following describes an apparatus for transmitting signals in the MAS in an embodiment of the present invention. In actual applications, the apparatus may be located at the transmit end, for example, in the base station. As shown in FIG. 3, the apparatus includes:

a coding module 301, configured to perform Alamouti coding on each group of common channel symbols to form two branches, where the common channel symbols may be data symbols transmitted in the common channel, for example, $s=[s_1, s_2]^T$;

a weight vector obtaining module 302, configured to select different weight vectors for different branches, where the beam modes corresponding to different weight vectors are uncorrelated and the peak-to-average power ratio of angle dimension of the two beam modes are lower than the preset threshold;

a beam forming module 303, configured to: form the beams for different branches according to the selected weight vectors, and obtain transmitting signals of each branch on each antenna; and a sending module 304, configured to: superimpose the transmitting signals of the two branches on each antenna, and transmit the superimposed signals.

This apparatus corresponds to the preceding method. The weight vector obtaining module 302 is configured to select a phase $\phi(t)$ for each branch and obtain a weight vector according to the fundamental weight vector w by using the following formula:

$$w(t) = \mathrm{diag}[1\, e^{j\phi(t)}\, e^{j2\phi(t)} \ldots e^{j(M-1)\phi(t)}] w$$

where the t represents the branch sequence number; the M represents the quantity of antennas; the diag[.] represents that elements in the brackets form a diagonal matrix; and the modulus of each component of the fundamental weight vector w is equal, and the peak-to-average power ratio of angle dimension of the two beam modes are lower than the preset threshold.

In this apparatus, the Alamouti coding is introduced; two independent virtual channels are generated by using the MAS; the spatial diversity gain is generated by using the independence of the two virtual channels. Thus, the performance of the MAS in full coverage is enhanced.

Those skilled in the art may understand that all or a part of the steps of the method according to the embodiments of the present invention may be implemented by a program instructing relevant hardware. The program may be stored in a computer readable storage medium, such as a ROM, a RAM, a magnetic disk, or an optical disk.

The above is a detailed description of a method and apparatus for transmitting signals in the MAS in the embodiments of the present invention. Although the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall within the scope of protection defined by the following claims or their equivalents.

What is claimed is:

1. A method for transmitting signals in a Multiple Antennas System (MAS), the method comprising:
   performing Alamouti coding on each group of common channel symbols to form two branches;
   selecting two different weight vectors for the two branches to perform beamforming;
   obtaining transmitting signals of each branch on each antenna, wherein two beam modes corresponding to the two weight vectors are uncorrelated and a peak-to-average power ratio of angle dimension of the two beam modes are lower than a preset threshold;
   superimposing the transmitting signals of the two branches on each antenna to obtain the superimposed signal on each antenna; and
   transmitting the superimposed signals;
   wherein the step of selecting different weight vectors for the two branches comprises selecting a phase $\phi(t)$ for each branch, and obtaining a weight vector w(t) based on a fundamental weight vector w by using the following formula:

$$w(t) = \mathrm{diag}[1\, e^{j\phi(t)}\, e^{j2\phi(t)} \ldots e^{j(M-1)\phi(t)}] w$$

wherein t represents a branch sequence number, M represents a number of antennas, and the diag indicates that elements in the brackets form a diagonal matrix; and
   wherein the peak-to-average power ratio of a beam mode corresponding to the fundamental weight vector w in terms of angle dimension is lower than the preset threshold.

2. The method of claim 1, wherein a modulus of each component of the fundamental weight vector is equal.

3. The method of claim 1, wherein after superimposing the transmitting signals of the two branches on each antenna, the method further comprises:
   grouping successive common channel symbols into frames, wherein each frame comprises two time-frequency blocks that transmit two code output symbols of Alamouti coding in terms of time-frequency dimension.

4. The method of claim 3, further comprising:
   performing beamforming on each frame by using a same group of weight vectors, wherein each group of weight vectors comprise two different weight vectors.

5. The method of claim 3, further comprising:
   obtaining a phase of a next frame according to a phase of a current frame and an inter-frame incremental phase, wherein the next frame is adjacent to the current frame in terms of time-frequency dimension.

6. An apparatus for transmitting signals in a Multiple Antennas System (MAS), the apparatus comprising:
   a processor, configured to
      perform Alamouti coding on a first group of common channel symbols to form two branches of coded symbols,
      select two different weight vectors $w_p$ (p=1,2) for the two branches by determining a phase $\phi_p$ for a branch p of the two branches and obtaining the weight vector $w_p$ for the branch p based on a fundamental weight vector w by using the formula:

$$w_p = \text{diag}[1\, e^{j\phi_p} e^{j2\phi_p} \ldots e^{j(M-1)\phi_p}]w; \quad (5)$$

obtain transmitting signals of each of the two branches for an antenna of the Multiple Antennas System by performing beamforming on each of the two branches according to the selected weight vectors and superimpose the transmitting signals of the two branches; and a transmitter, configured to transmit the superimposed signals through the antenna;

wherein two beam patterns corresponding to the two different weight vectors are uncorrelated and a peak-to-average power ratio in angular dimension of each of the two beam patterns is lower than a preset threshold;

wherein p indicates the branch p of the two branches, M represents a number of antennas used in the Multiple Antennas System and the diag indicates that elements in the brackets form a diagonal matrix; and wherein the peak-to-average power ratio in angular dimension of a beam pattern corresponding to the fundamental weight vector w is lower than the preset threshold.

7. The apparatus of claim 6, wherein a modulus of each component of the fundamental weight vector is equal.

8. The apparatus of claim 6, wherein the transmitter is further configured to transmit the superimposed signals in a first frame through the antenna.

9. The apparatus of claim 8, wherein the first frame further carries superimposed signals corresponding to a second group of common channel symbols, and the first group and the second group share the same weight vectors.

10. The apparatus of claim 8, wherein a second frame is a neighbor frame of the first frame, superimposed signals carried in the second frame corresponds to another two weight vectors $w_p'$ (p=1,2), and wherein $w_p' = \text{diag}[1\, e^{j(\phi_p+\delta)} e^{j2(\phi_p+\delta)} \ldots e^{j(M-1)(\phi_p+\delta)}]w$, and $\delta$ is a incremental phase value.

11. The apparatus of claim 8, wherein the first group of common channel symbols are represented as $s=[s_1, s_2]^T$, two resultant symbols carried in the superimposed signals are represented as $f_1(s_1, s_2)$ and $f_2(s_1, s_2)$, the first frame comprises a first time-frequency resource block and a second time-frequency resource block, and the transmitter is further configured to place the $f_1(s_1, s_2)$ on the first time-frequency resource block, and place the $f_2(s_1, s_2)$ on the second time-frequency resource block.

12. A method for transmitting signals in a Multiple Antennas System (MAS), the method comprising:

performing Alamouti coding on a first group of common channel symbols to form two branches of coded symbols;

selecting two different weight vectors $w_p$(p=1,2) for the two branches by determining a phase $\phi_p$ for a branch p of the two branches and obtaining the weight vector $w_p$ for the branch p based on a fundamental weight vector w by using the following formula:

$$w_p = \text{diag}[1\, e^{j\phi_p} e^{j2\phi_p} \ldots e^{j(M-1)\phi_p}]w;$$

obtaining transmitting signals of each of the two branches for an antenna of the Multiple Antennas System by performing beamforming on each of the two branches according to the selected weight vectors;

superimposing the transmitting signals of the two branches; and transmitting the superimposed signals through the antenna;

wherein two beam patterns corresponding to the two different weight vectors are uncorrelated and a peak-to-average power ratio in angular dimension of each of the two beam patterns is lower than a preset threshold;

wherein p indicates the branch p of the two branches, M represents a number of antennas used in the Multiple Antennas System and the diag indicates that elements in the brackets form a diagonal matrix; and wherein the peak-to-average power ratio in angular dimension of a beam pattern corresponding to the fundamental weight vector w is lower than the preset threshold.

13. The method of claim 12, wherein a modulus of each component of the fundamental weight vector is equal.

14. The method of claim 12, wherein the transmitting the superimposed signals through the antenna comprises:

transmitting the superimposed signals in a first frame through the antenna.

15. The method of claim 14, wherein the first frame further carries superimposed signals corresponding to a second group of common channel symbols, and the first group and the second group share the same weight vectors.

16. The method of claim 14, wherein a second frame is a neighbor frame of the first frame, superimposed signals carried in the second frame corresponds to another two weight vectors $w_p'$(p=1,2), and wherein $w_p' = \text{diag}[1\, e^{j(\phi_p+\delta)} e^{j2(\phi_p+\delta)} \ldots e^{j(M-1)(\phi_p+\delta)}]w$, and $\delta$ is an incremental phase value.

17. The method of claim 14, wherein the first group of common channel symbols are represented as $s=[s_1, s_2]^T$, two resultant symbols carried in the superimposed signals are represented as $f_1(s_1, s_2)$ and $f_2(s_1, s_2)$, the first frame comprises a first time-frequency resource block and a second time-frequency resource block and the transmitting further comprises:

placing the $f_1(s_1, s_2)$ on the first time-frequency resource block, and placing the $f_2(s_1, s_2)$ on the second time-frequency resource block.

* * * * *